March 25, 1941.   R. R. HOLDEN   2,235,961
OVERHEAD TROLLEY SYSTEM
Filed July 5, 1934   10 Sheets—Sheet 1
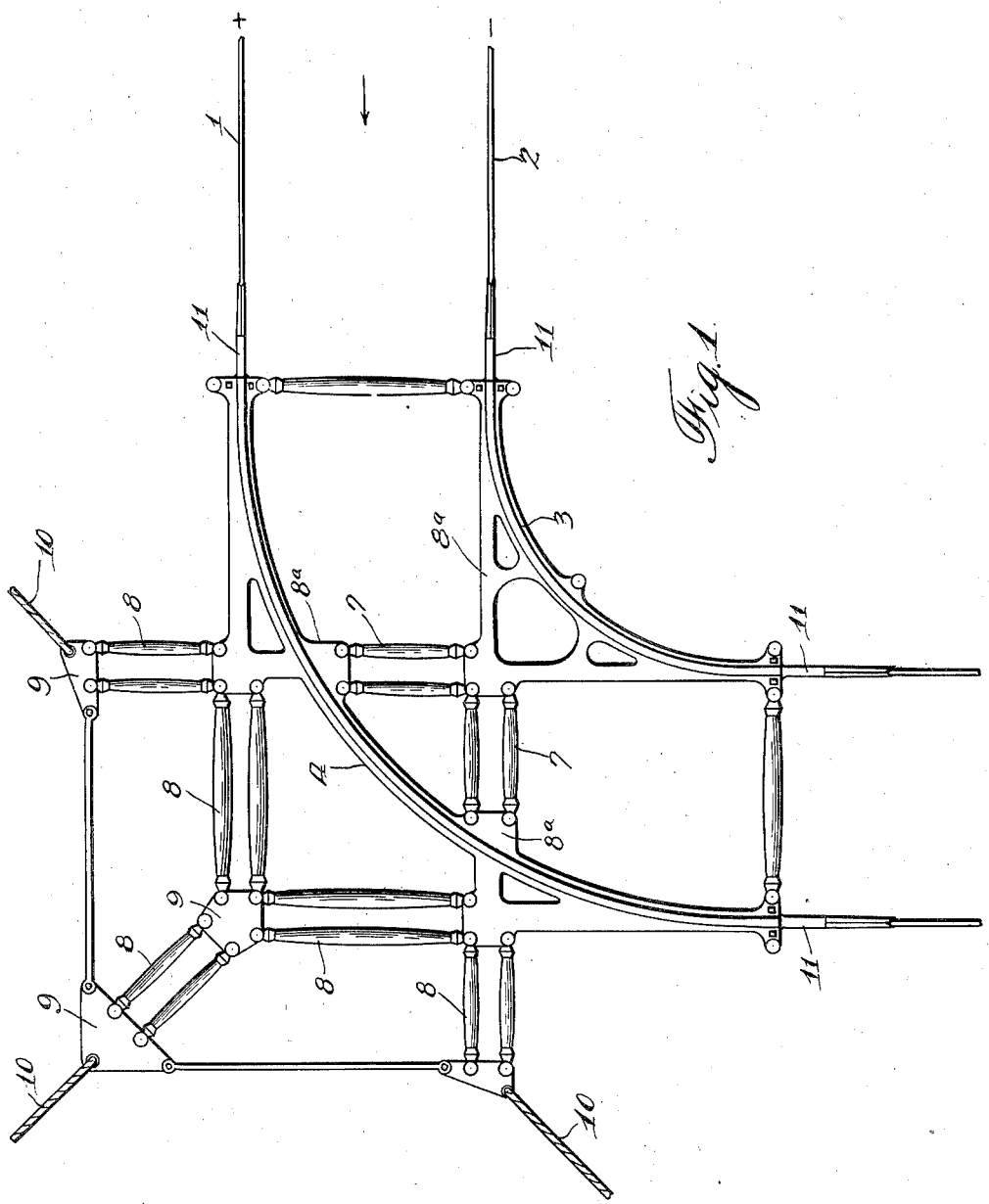

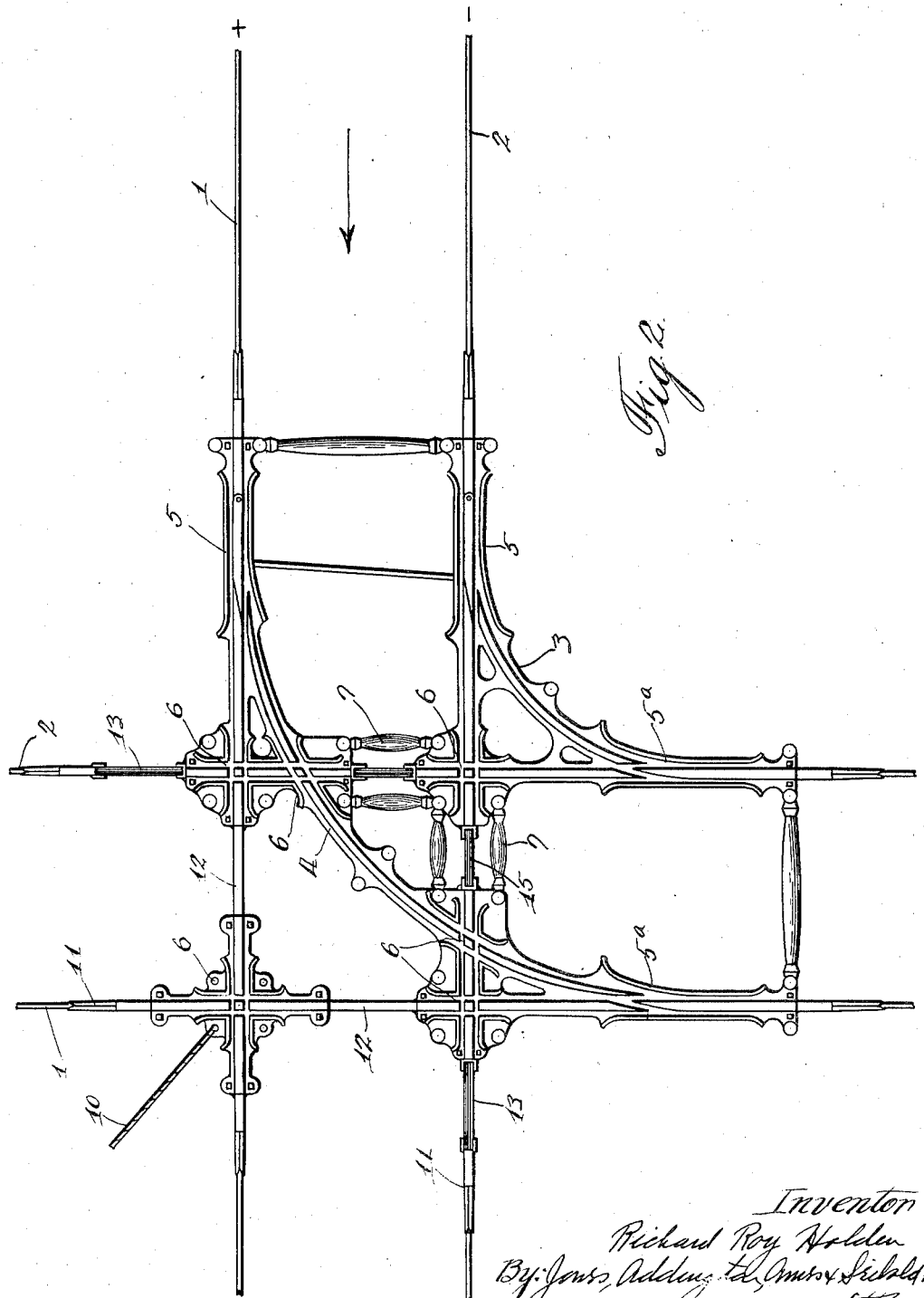

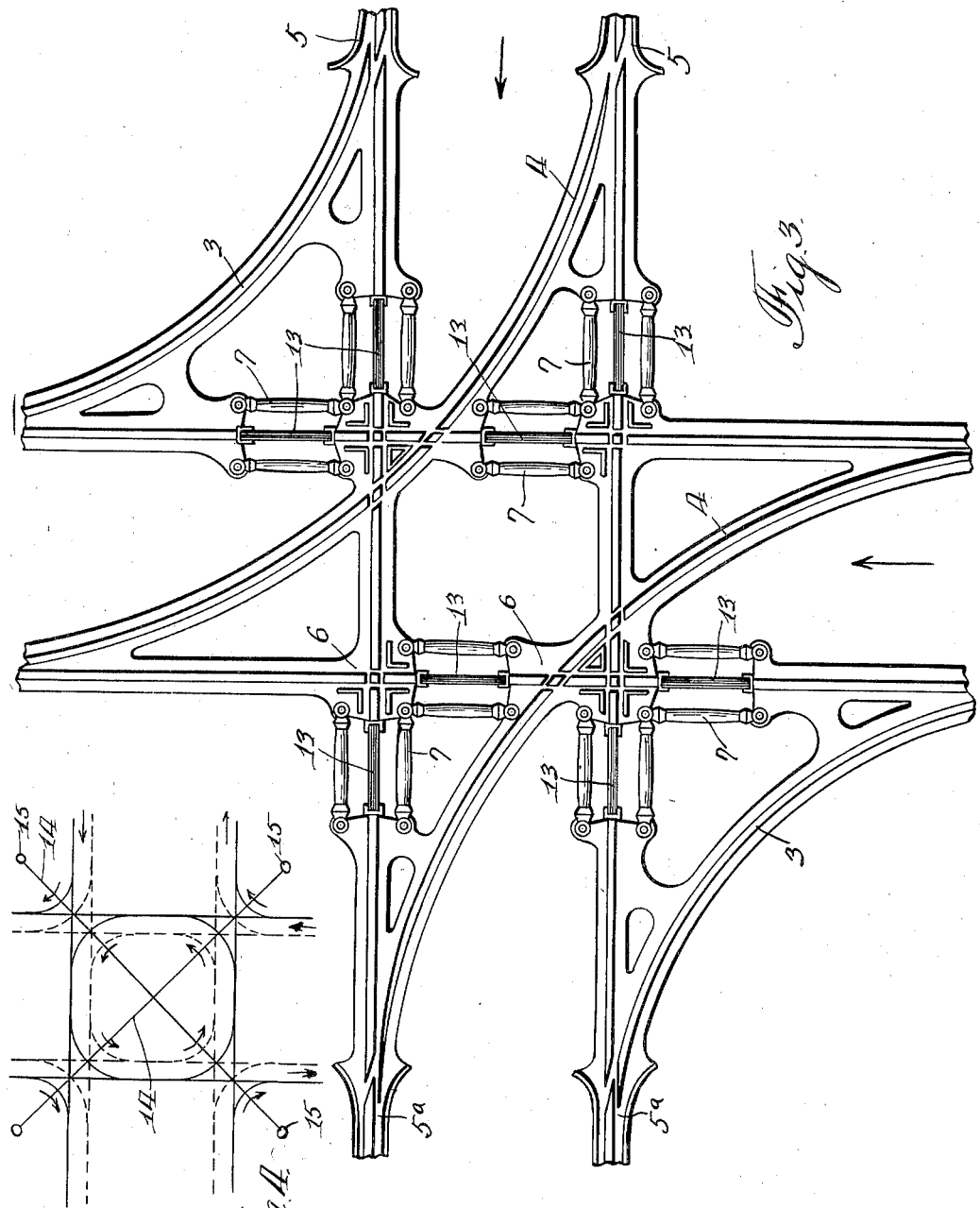

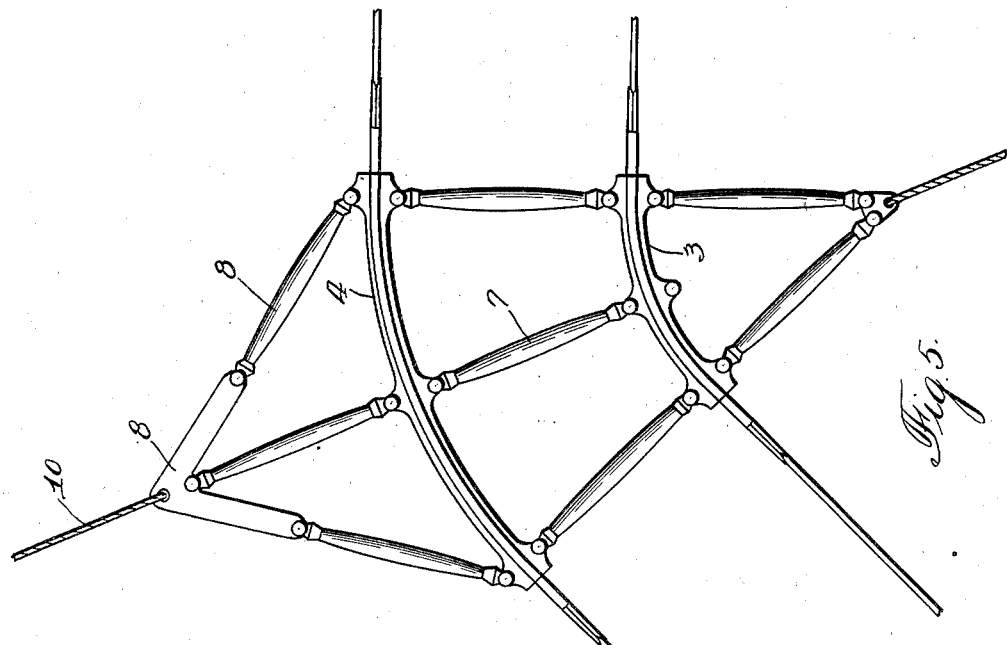
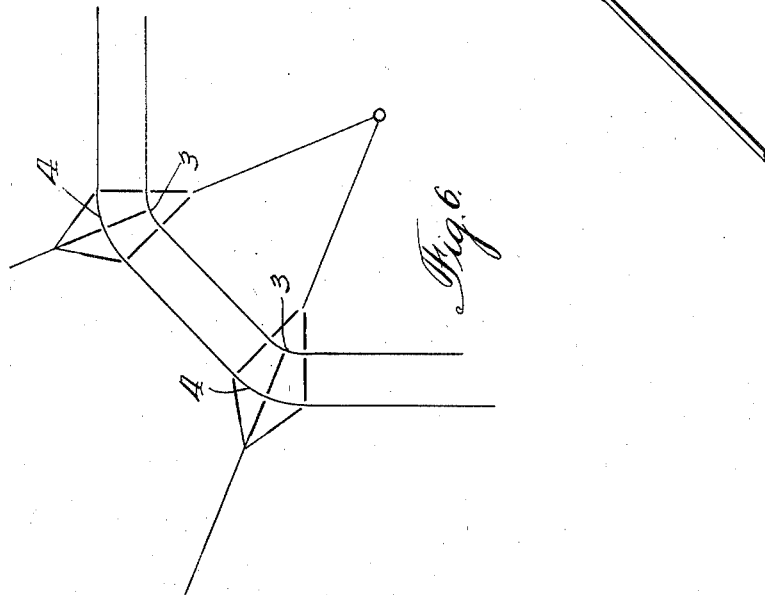

March 25, 1941. R. R. HOLDEN 2,235,961
OVERHEAD TROLLEY SYSTEM
Filed July 5, 1934 10 Sheets-Sheet 5
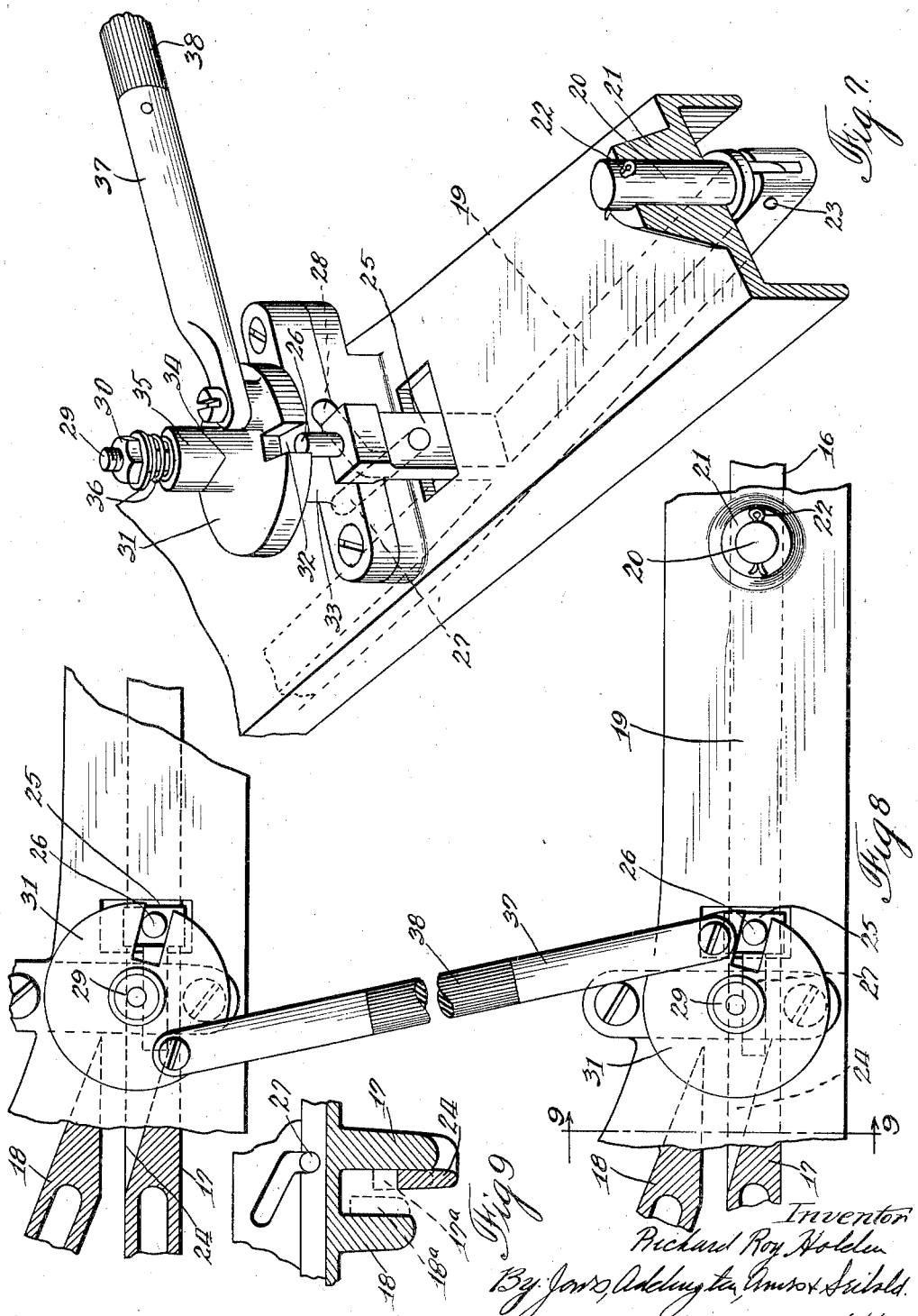

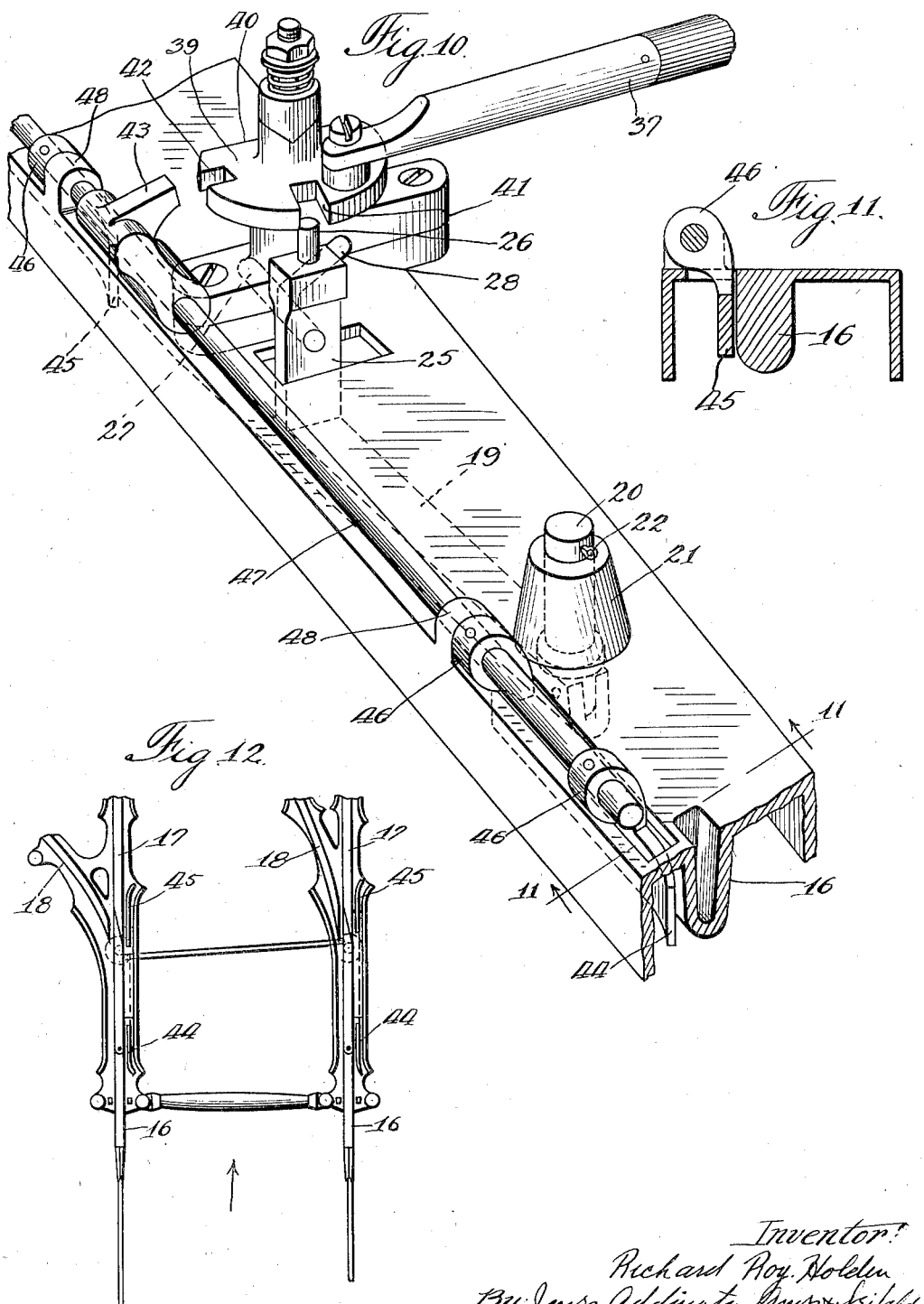

March 25, 1941.  R. R. HOLDEN  2,235,961
OVERHEAD TROLLEY SYSTEM
Filed July 5, 1934   10 Sheets-Sheet 7
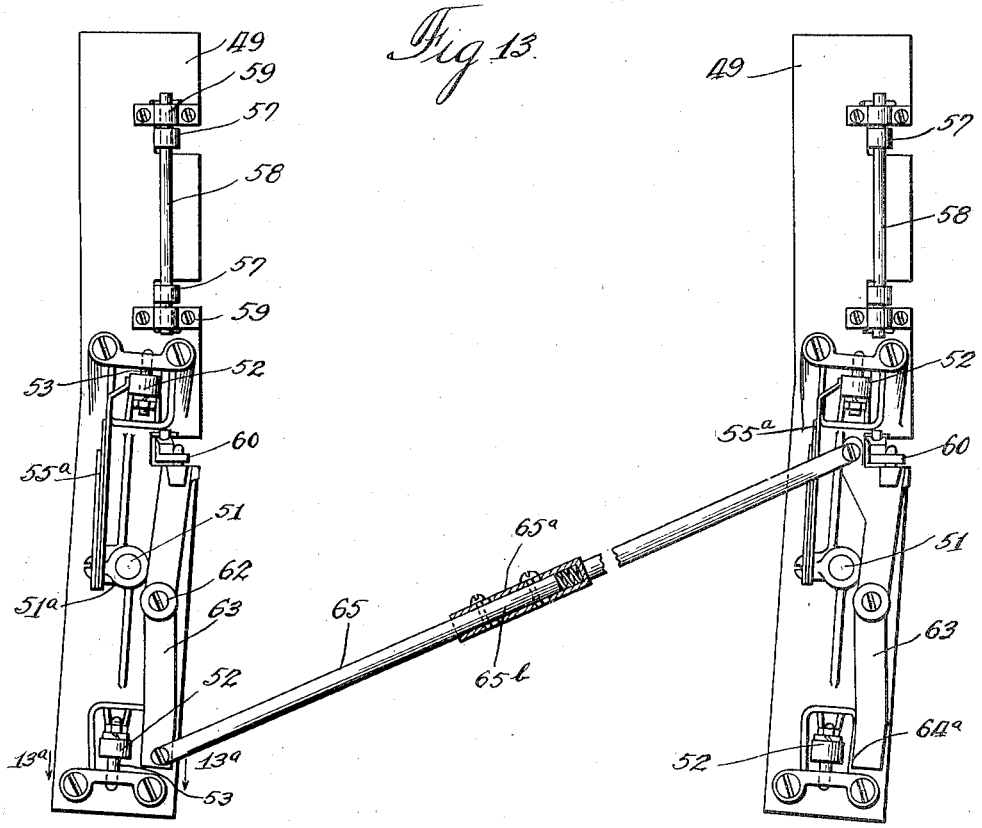
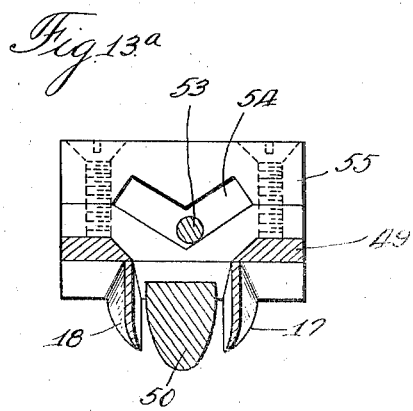
Inventor
Richard Roy Holden
By Jones, Addington, Ames & Seibold
Attys.

March 25, 1941.  R. R. HOLDEN  2,235,961
OVERHEAD TROLLEY SYSTEM
Filed July 5, 1934  10 Sheets-Sheet 8
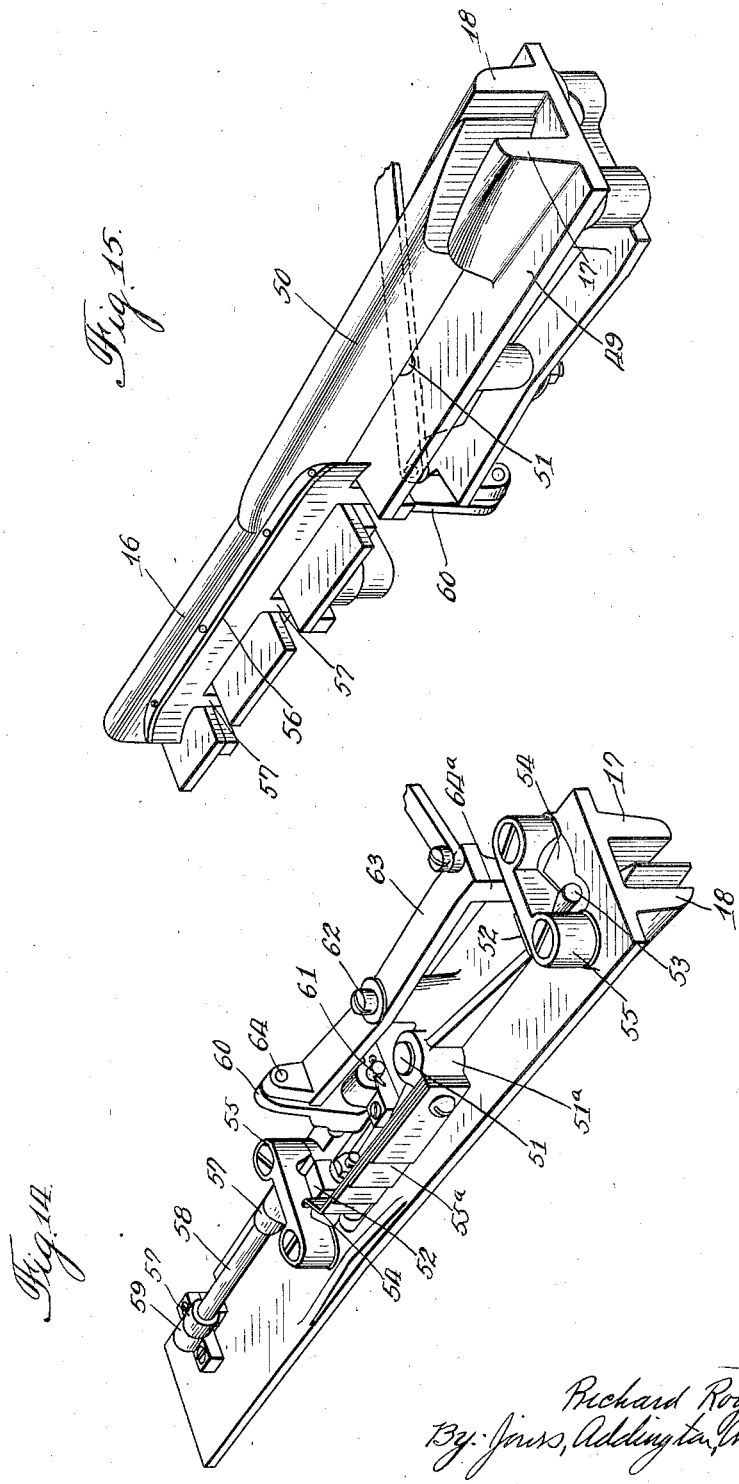
Inventor
Richard Roy Holden
By Jones, Addington, Ames & Seibold
Attys.

March 25, 1941.  R. R. HOLDEN  2,235,961
OVERHEAD TROLLEY SYSTEM
Filed July 5, 1934   10 Sheets-Sheet 9
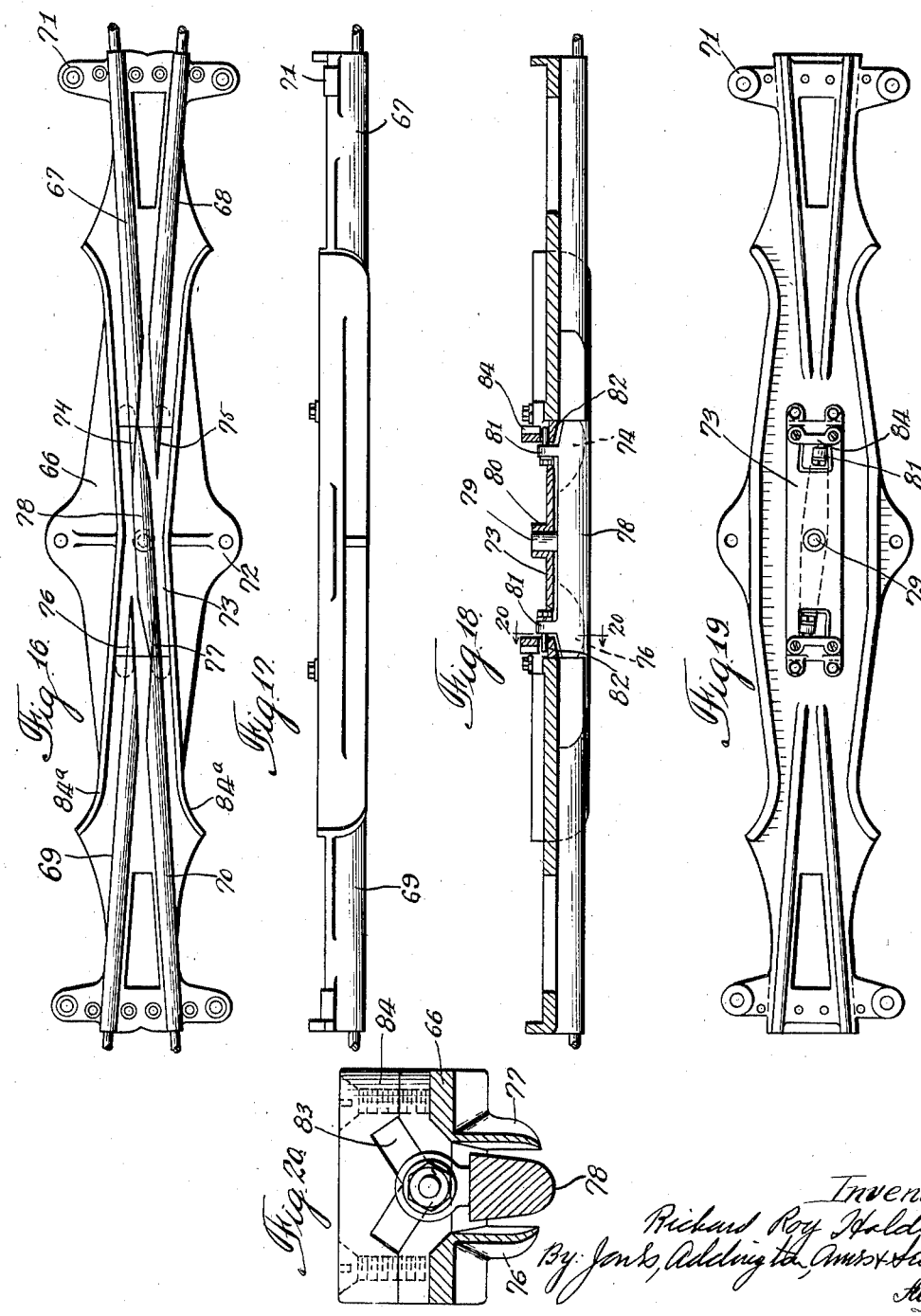

March 25, 1941.  R. R. HOLDEN  2,235,961
OVERHEAD TROLLEY SYSTEM
Filed July 5, 1934  10 Sheets-Sheet 10
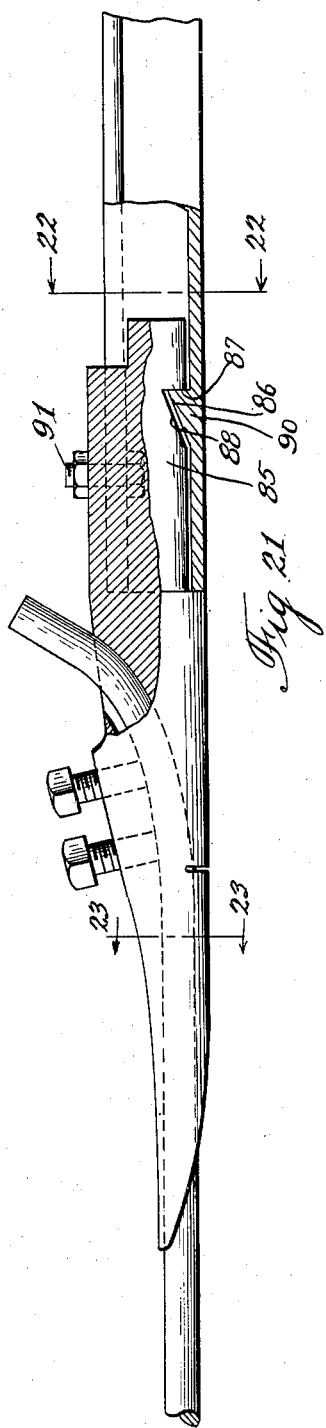
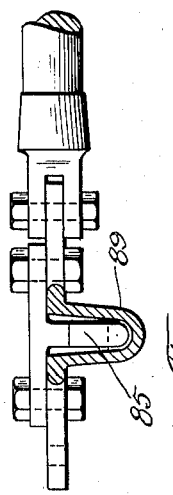
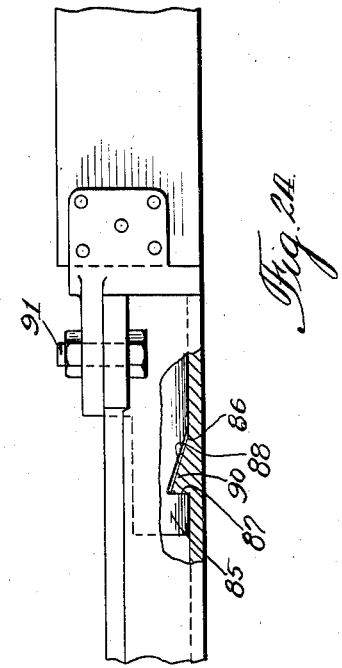
Inventor
Richard Roy Holden
By Jenso, Addington, Ames & Seibold
Attys.

Patented Mar. 25, 1941

2,235,961

UNITED STATES PATENT OFFICE 2,235,961

OVERHEAD TROLLEY SYSTEM

Richard Roy Holden, Highland Park, Ill.; Bertha Belle Holden, executrix of said Richard Roy Holden, deceased, assignor, by mesne assignments to R. Roy Holden, Inc., Chicago, Ill., a corporation of Illinois Application July 5, 1934, Serial No. 733,708

20 Claims. (Cl. 191—37)

This invention relates to an over-head trolley system designed to be used particularly with trolley busses or other electrically driven vehicles, having current collecting-members carried thereby for contacting a positive and a negative current conductor.

More specifically, this invention has reference to an over-head trolley system including current conductors, curves, switches, cross-overs, etc., for use with trolley busses, which system is so designed that the current-collecting members automatically follow the trolley wires under which the trolley bus passes.

The trolley busses may be constructed with a base on the top thereof on which two trolley poles are mounted to swing about two fixed, transversely aligned points which are usually two feet apart. The positive and negative wires for use with trolley busses are usually the same distance apart. On the upper ends of the trolley poles, which are generally about 18 feet long, a swivel harp is mounted for carrying a current-collecting member, usually a trolley shoe or slide and sometimes a wheel. With this arrangement the trolley poles may swing about their fixed points and the shoes will stay in contact with an slide along their respective wires even when the bus is off to one side of the wires. If the busses are moving parallel to the wires the poles remain parallel, being the same distance apart at their bases as at their points of contact with the wires. If the bus is at an angle to the wires, that is, is moving toward or away from the vertical planes in which the wires lie, the poles are farther apart at their outer ends than adjacent the base, and one is in advance of the other a distance depending upon the size of the angle, or, in other words, the amount of turn of the trolley bus.

An over-head system for trolley busses will usually include positive and negative wires with switches, cross-overs and curves. The whole system, in accordance with the present invention, is so arranged that even when trolley shoes carried by a swivel harp are used they will automatically follow the wires under which the bus passes, through cross-overs and switches and around curves.

Prior to the present invention trolley bus systems have been employed which, when a trolley bus was passing thereunder, required a certain amount of attention and action on the part of the bus driver, particularly in passing through switches. Various switches have been employed in double conductor or wire systems which were actuated by some act of the driver. In one type of such switches the movable switching member is electrically thrown in accordance with whether the operator of the bus has his power on or off as he passes a certain point, depending upon whether he wishes to turn or go straight. However, so far as I know there have been no switches which automatically direct the current collecting-members so that they will follow the current collectors along the path of the bus irrespective of whether the bus turns or goes straight, and this without any attention on the part of the operator.

An object of the present invention is, therefore, to provide a double conductor trolley system which automatically acts to direct the current-collecting members along the conductors of the path of the bus.

Another object of the invention is to provide a switch construction adapted to be used in a double conductor trolley system which automatically acts to direct the current-collecting members along the proper conductors. If the bus in passing under certain wires turns so as to pass under other wires the switch acts to direct the current-collecting members accordingly whereas, if the bus continues ahead the current-collecting member is directed straight through the switch. The switch may be constructed to permit of limited turning of the bus so as to allow a driving range for usual traffic conditions, without causing the current-collecting members to switch. It is only when the bus turns more than a predetermined amount, such, for example, as when turning a corner, that the switch operates to direct the current-carrying members likewise. The amount of driving range desired may be determined in accordance with the conditions of its use. The switch may also be constructed so as to operate automatically when the direction of travel of the current-collecting members through the switch is reversed.

Another feature of the present invention is to provide a cross-over which is particularly suitable for use where the intersecting wires form a small angle. The cross-over is designed to positively guide even a current-collecting member mounted on a swivel harp under the cross-over so as to continue along the same wire, thereby preventing any possibility of the current-collecting member switching from one wire to another, which might occur if no positive guide means were provided. The cross-over of this invention acts automatically to direct the current-carrying member. It has a minimum of moving parts and may therefore be comparatively light in weight and inexpensive to manufacture. There is therefore very small possibility of the cross-over becoming inoperative for any reason.

A further object of this invention is to provide a new type of curve construction which is particularly efficacious in a double-conductor system. Heretofore the customary practice in forming curved and double-conductor systems has been to support the wires at the curves in the same manner as was done in single wire systems such as are used with street cars and to place the curves in practically the same position as if tracks were to be used, that is, in a gradual curve having a radius of considerable size. This old method of forming curves when used in a double-wire system requires the use of a great deal of complex supporting equipment. Due to the amount and complexity of the supporting equipment considerable time is required in constructing a curve, and particularly in double-conductor systems the weight of the supporting equipment required at an intersection or even an ordinary curve is enormous.

I have found that it is not necessary in trolley systems to employ curves having a large radius, but that for a 90° curve a radius of two feet will operate satisfactorily, although it may be desirable to employ a larger radius which would still be considerably smaller than the radius employed in the usual flexible wire curve for the same angle. The type of curve contemplated by the present invention is substantially rigid. When used in a double conductor system the two curves may be secured together by rigid insulating members such as wood strains or the like so that the whole structure is substantially unitary. If desired, the rigid curves of the present invention may be used to connect a pair of switches, and in some cases a cross-over or cross-overs could be added to form a unitary structure. In view of the small radius and the rigidity of the curves only a comparatively small amount of supporting structure is necessary and in many cases one or two cross spans will suffice, these serving merely to provide a vertical lift. Therefore, the supporting structure necessary is materially reduced and the time and cost of installation are cut down to a minimum. It is also comparatively simple to provide the desired tension on the wires when a rigid curve is employed, which was extremely difficult in the flexible wire type of curve previously employed. The radius of the curves may be more than two feet, the upper maximum being limited more by the weight of the structure than anything else.

In case it is desired to employ a more gradual curve two pairs of rigid curves may be employed, connected by ordinary trolley wires. Therefore, it is possible, with the curve of this invention, to form a trolley system of any desired shape, including loops and Wyes.

A still further object of the present invention is to provide on various fittings a locking or interfitting arrangement which serves to secure the fittings together with an equalization of the strain thereon. With a locking arrangement, as will be hereinafter more fully described, the various elements may be fastened in the system more swiftly and securely.

The present invention is not only particularly adapted for use in a double-conductor or two-wire system but may be used in whole or in part in a single-wire system or in a combination of the two where both street cars and trolley busses pass under at least part of the same system.

Other objects and advantages of the present invention will be apparent from the following description when taken together with the accompanying drawings in which latter:

Figure 1 is a bottom plan view of a portion of a double-conductor trolley system showing a simple curve and the supporting structure therefor;

Fig. 2 is a bottom plan view of a portion of a double-conductor trolley system showing an intersection with rigid curves, switches, and cross-overs, secured together to form a unitary structure;

Fig. 3 is a view similar to Fig. 2 but having an additional curve portion to form a quarter of a grand union;

Fig. 4 is a diagrammatic top plan view of a double trolley system grand union;

Fig. 5 is a view similar to Figure 1 but showing a 45° curve with supporting structure therefor;

Fig. 6 shows a construction in which two 45° curves are employed to form a 90° curve having a comparatively large radius;

Fig. 7 is a top perspective view of a portion of one form of automatic switch embodying the present invention;

Fig. 8 is a fragmentary top plan view of a pair of switches embodying the present invention connected together;

Fig. 9 is a cross-sectional view taken on the line 9—9 of Fig. 8;

Fig. 10 is a top perspective view of a portion of another form of switch which may be employed;

Fig. 11 is a cross-sectional view taken on the line 11—11 of Fig. 10;

Fig. 12 is a bottom plan view of a pair of switches of the type shown in Fig. 10 connected together in a double-wire system;

Fig. 13 is a top plan view of another form of switch which may be used in the system, connected together in a pair;

Fig. 13a is a cross-sectional view taken on the line 13a—13a of Fig. 13;

Fig. 14 is a top perspective view of one of the switches shown in Fig. 13;

Fig. 15 is a bottom perspective view of the other switch shown in Fig. 13;

Fig. 16 is a bottom plan view of a cross-over embodying the present invention;

Fig. 17 is a side elevation of the cross-over shown in Fig. 16;

Fig. 18 is a central cross-sectional view of the cross-over shown in Fig. 16;

Fig. 19 is a top plan view of a cross-over shown in Fig. 16;

Fig. 20 is a cross-sectional view taken on the line 20—20 of Fig. 18;

Fig. 21 is a side elevational view, partially in section, of a dead-end approach, showing the locking means which form a part of this invention for securing the same to the other fittings;

Fig. 22 is a cross-sectional view taken on the line 22—22 of Fig. 21;

Fig. 23 is a cross-sectional view taken on the line 23—23 of Fig. 21; and

Fig. 24 is a side elevational view, partially in section, of an insulator connected to another over-head trolley fitting by the locking means shown in Fig. 21.

Referring more particularly to the drawings, there is shown an over-head trolley system having positive wires 1 and negative wires 2. It is usual in double-conductor overhead trolley systems to have the negative wire adjacent the curb and the positive wire toward the center of the street, although this may be reversed. Such a system may include curves which are preferably formed, in accordance with the present invention, of rigid or substantially rigid curve members 3 and 4, as shown in Figs. 1, 2 and 3. Pairs of switches 5 and various cross-overs 6 are generally employed. In addition, there may be the usual fittings such as approaches, section insulators, wood strains, and various supporting elements such as cross-spans, pull-offs, etc.

Referring to Figs. 1 through 6, the rigid or substantially rigid curve members forming a feature of the present invention are shown. In Figs. 1, 5 and 6 these curve members 3 and 4 are shown as employed by themselves, that is, without the presence of any switches, cross-overs, etc. It has been the usual custom in the past, in setting up a double-conductor trolley system, to form curves by merely supporting the trolley wires so that the same formed a curve, the curvature usually being approximately the same as that employed with street cars where tracks are used and the wires are positioned over the tracks. When this is done ears are secured to the trolley wires in the usual fashion rather close together to which pull-off hangers are fastened. Guys then run from the pull-off hangers to poles or bull-rings which in turn are fastened to the poles. In a double conductor system this necessitates the use of a large number of such supporting means which consequently require considerable time for installation and when installed frequently weigh thousands of pounds. There is also the disadvantage that when the wires themselves are supported so as to form the curve it is exceedingly difficult to get the proper tension on the wires. I have found that it is not necessary to employ curves of the usual large radius, but that the curves may be constructed with a radius as small as approximately two feet. These curves comprise curve members 3 and 4 which may be castings, and are preferably fastened together by means of wood strains 7 which may be bolted to outwardly extending portions 8a, provided therefor at the sides of the curve members. The curve is therefore, when ready for installation, a substantially unitary structure. Additional wood strains 8 may be connected to securing plates 9 which in turn are supported from trolley poles (not shown) by guys 10. When it is desired to position the curve structures of the present invention, such as shown in Figs. 1, 5 and 6, the whole may be assembled on the ground and then speedily put up by merely connecting the guys to the poles. With this construction not only is the time of installation materially cut down, but the weight of the whole may be reduced many hundreds of pounds, the cost thereof is materially less, and the trolley wire or conductors connected thereto may be provided with the proper tension.

I have ascertained that the smallest curve members 3 may be formed with a radius as small as approximately two feet. As the radius is decreased less than this the danger of the current-collecting members coming off the wires is increased. Experience has shown that curves with radii of from 4 to 8 feet are usually the most desirable. This radius is sufficiently great to provide an easy passage of the current-collecting members and the weight is kept down. Although curves having a larger radius may be employed their weight would be greater and it is generally advisable to keep the weight as low as possible.

In referring to the radius of these curves I wish to point out that they are preferably substantially arcuate, but need not be of uniform curvature throughout.

If it should be desired for any reason to form a curve having a larger radius, this may be done by employing two smaller curves such as 45° curves, as shown in Fig. 6, with the usual trolley wires between the same. In the same manner through the use of curve members, which may be 45°, or more or less as desired, loops and other shapes may be formed. Although only 45° and 90° curves are shown, the curvature may be made greater than 90° or less than 45°.

At the end of the curve portions, approaches 11 are fastened which fit about the wires in the usual manner and provide a smooth passage for the current-collecting members in passing from the wires onto the rigid curve members.

In Figs. 2, 3 and 4, in addition to one, two or more pairs of curve members 3 and 4, there are shown switches 5 and 5a and various cross-overs 6. In these constructions also the various members may be secured together in a unitary structure. Referring to Fig. 2, the inner curve member 3 may be formed integrally, such as by casting or any other desirable means, with a switch at each end thereof and a cross-over. The outer curve member 4 may also be formed with a switch at each end and four cross-overs. The only other fitting necessary is an additional cross-over. These three elements may be secured together, as previously explained, by wood strains 7, or any other suitable means, and with rigid connecting members 12. In order to insulate the positive and negative wires from each other where such is necessary, various insulating runner members 13 are preferably employed.

This construction requires even fewer supporting elements than were discussed in connection with Figs. 1, 5 and 6. With the intersecting wires as shown in Fig. 2 it would probably be sufficient to take care of the side pull by employing a single guy 10 connected to the outer cross-over. In addition it will probably be desirable to have two cross-spans 14 connected to the diagonally oppositely-positioned poles 15, as shown in Fig. 4, from which wires may be dropped to the fittings to provide the vertical support necessary. In the construction shown in Fig. 3 and diagrammatically in Fig. 4 it will only be necessary to employ the two intersecting cross-spans 14 with the drops for providing the necessary vertical support. This, obviously, does away with practically all the supporting structure ordinarily required when the wires themselves are mounted to form the curve.

Referring to Figs. 2 and 3, pairs of switches 5 may be provided in the over-head trolley system for switching the current-collecting members from the current conductors along which they are passing to intersecting conductors, or guiding them straight through the switches. Various types of switches may be employed which will automatically act to direct the current-collecting members so that they will follow the wires under which the bus passes without any action whatsoever being required on the part of the operator of the bus.

One form of switch which may be employed is shown in Figs. 7 through 9. This form of switch may comprise a main runner 16, branch runners 17 and 18, and a movable switching member 19, which serves to guide a current-collecting member passing along the main runner 16 to either of the branch runners 17 or 18. In effect branch runner 17 is a continuation of the main runner 16 and may be considered as a part of the main runner. The movable switching member 19 is pivotally mounted at its end adjacent the main runner 16 so as to be capable of pivoting about a horizontal and a vertical axis. One means of mounting is shown in Figs. 7 and 8 and comprises a shaft 20 mounted in the end of the movable member 19. The shaft 20 may extend up through a bearing portion 21 in the switch. Any means such as a cotter pin 22 may be provided for holding the shaft 20 in the bearing 21. This provides for the horizontal movement of the movable member. A pin or similar member 23 extends through the sides of movable member 19 and through the portion of the shaft 20, extending thereinto by means of which the movable member 19 may be pivoted vertically. Although the shaft 20 is shown positioned very closely to the end of the movable member 19, it may be at a little distance from this end. The shaft 20 serves to hold one end of the movable member 19 adjacent the end of the main runner 16 so that a current-collecting member may pass from the main runner to the movable member. The opposite end of the movable member 19 is tapered, as at 24, so as to engage the complementary tapered portions of the branch runners 17 and 18.

Adjacent the end 24 there may be provided an upwardly extending portion 25 having a pin 26 projecting upwardly therefrom. Another pin 27 extends outwardly from the portion 25 and seats in a slot 28, as shown particularly in Figs. 7 and 9. This slot is preferably shaped with a lower vertical portion and an upper slanting portion so that as the movable member 19 is moved upwardly it first is guided straight upwardly through the vertical portion of the slot and then diagonally through the slanting portion. Although Figs. 7 through 9 disclose only one form of slot, it is to be understood that slots of other shapes could be employed to accomplish the same result, with suitable modifications of the remainder of the switch.

When a slot of the shape shown in Figs. 7 and 9 is employed the branch runner 17 preferably projects downwardly below the branch runner 18. With pin 27 in the bottom of slot 28, the end 24 of switching member 19 extends below both the branch runners 17 and 18 and rests in the full line position shown in Fig. 9. As the pin 27 is moved up to the top of the vertical portion of the slot 28, the lower portion of the movable member 19 is substantially in the same horizontal plane as the lower portion of the branch runner 17. This position is shown in the dotted line position 17a. When in this position a current-collecting member passing under the main runner 16 engages movable member 19 and then passes on to branch runner 17. In other words, the current-collecting member would proceed straight through the switch. Upon further movement of the pin 27 in slot 28 to the upper end of the slot, the end 24 takes the position shown at 18a adjacent branch runner 18 and when in this position directs the current-collecting member passing thereunder to the branch runner 18. It is therefore to be seen that the moving member 19 directs the current-collecting members depending upon whether the end 24 is in the operative position 17a or 18a.

Extending upwardly from the switch above the slot 28 is a shaft 29 which may have the upper end threaded to receive a nut 30. Mounted on the shaft 29 may be a disk 31 having a slot 32, which normally is positioned above the pin 26. The disk 31 is supported on a shoulder 33. The upper portion of the disk is provided with a groove 34 in which a complementary retaining member 35 fits and which may be pressed against the groove 34 by a spring or other resilient member 36. The nut 30 serves to hold the spring so that a downward pressure is exerted by the retaining member 35 against the groove 34 of disk 31. This tends to maintain the disk in normal position. A connecting member 37, which is provided with an insulating portion 38 therein, connects the respective disks 31 in the pair of switches. The connecting member 37 is pivotally connected to one side of one of the disks 31 and to the opposite side of the other disk 31 so that movement of one of the disks tends to move the other in the opposite direction.

With this construction, if the movable members 19 of each switch of a pair are moved upwardly substantially simultaneously, both pins 26 will engage the slots 32, thereby preventing rotation of the disks, and the pins 27 will be held at the upper end of the vertical portions of the slots 28 with the ends 24 of the members 19 in the dotted position 17a. When this occurs the current-collecting members will pass straight through the pair of switches. The force for moving the movable members 19 upwardly is exerted by contact of the current collectors therewith so that if the trolley bus carrying the current-collecting members is going practically straight ahead at the time the current-collecting members strike the movable member 19 the current-collecting members would be substantially parallel and would strike the movable members 19 substantially simultaneously. Therefore, if the trolley bus is going straight ahead, the switch automatically acts to direct the current-collecting member straight through the pair of switches.

On the other hand, if one of the current-collecting members is a sufficient distance ahead of the other, which may be caused by the bus turning, the forward current-collecting member would strike one of the movable members 19 before the rearward current-collecting member reached its switch. In this case the movable member 19 engaged by the forward current-collecting member would be moved upwardly and the pin 27 would be moved throughout the length of the slot 28. Pin 26 would engage slot 32 and rotate disk 31, as there would be nothing to prevent the rotation of the other disk 31. This would cause the end 24 of the switching member 19 to be moved to the dotted position 18a, and the current-collecting member would be switched to the branch runner 18. After the forward current-collecting member has passed onto the branch switch 18 the retaining member 35 would cause the disks to be returned to their normal position, and when the rearward current-collecting member reached the movable switching member 19 of the other switch of the pair it would be caused to switch in the same manner. Therefore the switches shown in Figs. 7 through 9 would automatically act to direct the current-collecting member straight through the switch if the trolley bus carrying the current-collecting members is moving straight ahead, while, if one of the current-collecting members is a sufficient distance ahead of the other, both current-collecting members would be respectively switched so as to follow the wires above the path in which the bus is traveling.

Another form of switch which may be used is shown in Figs. 10, 11 and 12. This switch may be constructed to take care of conditions at various points in accordance with the problems involved in each location. This type of switch is also automatic and serves to direct pairs of current-collecting members coming in contact with a pair of switches to the proper wires or conductors in accordance with the path of travel of the trolley bus carrying the current collectors.

In order to make a turn and switch from one set of wires to another, it is necessary for the trolley bus to turn through a certain number of degrees, which may vary according to the turn which it is making. As the trolley poles upon which the current collectors are mounted are customarily 18 feet long with a normal size bus, they are positioned substantially above the rear of the bus when in contact with the trolley wires. Therefore, in making a curve, the bus will have turned through a considerable angle before the current-collecting members strike the switches. As the bus turns, the relative longitudinal position of the current-collecting members of a pair alters. When the bus is going straight ahead, the current-collecting members carried thereby are in substantially transverse alignment, but, as the bus turns, one of the current collectors moves in advance of the other a distance, depending upon the angle through which the bus turns. It is desirable to provide a certain amount of latitude in the relative position of the current-collecting members so that, even if the bus goes straight ahead along the wires under which it is passing, it may be turn to some extent to provide for a usual driving range without causing the current-collecting members to be switched.

The switches shown in Figs. 10 through 12 act to switch the current-collecting members when the trolley bus carrying the same makes a sufficient turn to longitudinally alter the relative position of the current-collecting members of a pair at least a certain distance. If the bus turns less than this distance which may be altered, or is going straight ahead, the current-collecting members continue through the switch along the wires under which they were passing.

The switch shown in Fig. 10 is in many respects the same as that previously discussed in connection with Figs. 7 through 9. There are a few changes and additions. Instead of employing a disk 31, as shown in Figs. 7 and 8, with a single notch therein, only a portion of a disk 39 is employed, the same being cut off as shown at 40, and two notches 41 and 42 are provided in the periphery thereof. The notch 41 receives the pin 28 therein, as previously described, and the notch 42 is designed to receive a lug 43, which, when it is seated in the notch 42, prevents rotation of the disk portion 39.

Each switch is also provided with a pair of rails 44 and 45 preferably of the same length. Extending upwardly from each rail 44 and 45 are a pair of loop members 46 which fit about a rock shaft 47, which latter in turn is oscillatably mounted in bearings 48. The lug 43 is also fixedly mounted on the rock shaft 47. With this arrangement, as the rails 44 or 45 are moved away from the main runner 16 and the branch runner 17, shaft 47 is rocked and lug 43 is thereby seated in the slot 42 in disk portion 39, which serves to hold the disk portion substantially immovable. The rails 44 and 45 are so positioned with respect to the runners 16 and 17 that as the flange of a current-collecting member passes between a rail and its adjacent runner, it moves the rail away from the runner a sufficient distance to move the rock shaft and cause the lug 43 to seat in slot 42. With this construction, when a pair of current-collecting members which are longitudinally displaced a distance less than the length of the rails 44 come in contact with a pair of switches, the disk portions 39 will be locked against rotation by lug 43 seating in slot 42. Therefore, pins 26, when seated in the slots 41, will hold the pins 27 in the vertical portions of slots 28 so that the ends 24 of movable members 19 are held in the position shown by dotted lines at 17a in Fig. 9, and the current-collecting members will pass straight through the switch. Thus, by varying the length of the rails 44, the angle through which a trolley bus may turn before causing the current-collecting members to switch may be controlled.

As the length of the rails 44 is increased, the angular driving range is also increased. It has been found, through experience, that with the average size bus having 18 foot trolley poles thereon, a turn of substantially 5 degrees is permitted for each two inches of length of the rails 44, while still preventing switching of the current-collecting members. If the current-collecting members are substantially transversely aligned in passing through the pair of switches disclosed in Figs. 10 through 12, the switch operates as previously described in connection with those shown in Figs. 7 through 9 and the rails 44 and 45 would be unnecessary. If, however, one of the current-collecting members is slightly in advance of the other, the first one to strike the rail 44 locks the disk portion 39, which, due to the connecting member 37, likewise locks the other disk portion 39. If the rearward current collector engages the other rail 44 before the advance collector has passed beyond its rail 44, the other disk 39 is locked. The rails 44 extend a distance alongside the movable switching members 19, and, as each current-collecting member engages its respective movable member 19, its pin 26 fits into its respective slot 41. When one of the current-collecting members is on the movable member 19 and the other engages one of the rails 44, the disk portions 39 are also locked.

In order to hold the disks 39 stationary until both current-collecting members are off the movable switch members 19, the rails 45 are employed. These act to lock the disks 39 in the same manner as the rails 44. Thus, it is only when the current-collecting members are longitudinally displaced a distance greater than the length of the rails 44 that the current-collecting members will switch to the branch runners 18. When the longitudinal displacement of the current-collecting members is sufficiently great to cause the switching action, this occurs in the same manner as previously described in connection with the switch shown in Figs. 7 through 9. It is therefore to be seen that the operation of the pair of switches is completely automatic and is controlled by the relative longitudinal displacement of the current-collecting members when coming in contact therewith, which in turn may be controlled by the amount of curve of the bus.

Still another form of switch which may be employed in the present system is shown in Figs. 13, 14 and 15. This type of switch is operated by the relative longitudinal displacement of the current-collecting members in practically the same manner as described in connection with the switches shown in Figs. 10 through 12. This form of switch has the further advantage that the direction of travel of the current-collecting members through the switch may be reversed, such as when the trolley bus backs up, and even in this case, the switch will act to automatically guide the current-collecting members therethrough, from either of the branch runners 17 or 18 along which they are traveling to the main runner 16.

The switch shown in Figs. 13 through 15 is provided with a base 49, from which the main runner 16 and the branch runners 17 and 18 depend. A movable switch member 50 is mounted on the base 49 and is pivoted thereto by pivot 51, which is positioned intermedite the ends of the movable member 50, and preferably substantially midway between the ends thereof, although it may be closer to the end adjacent the main runner 16. The pivot 51 fits slidably into bearing portion 51a so as to be capable of vertical movement, as well as rotation. In each of the switches a portion 52 extends upwardly from movable member 50 adjacent the ends thereof. Projecting from the portions 52 are pins 53, adapted to ride in slots 54, provided in the guide members 55. These slots are substantially V-shaped, as shown particularly in Fig. 13a.

When in their normal position, the pins 53 rest substantially at the bottom of the slot 54, being held there by the weight of the movable switching member 50, which is then in the position shown primarily in Fig. 15. With this arrangement, when the movable member 50 is moved upwardly by the current-collecting members, pins 53 ride upwardly in the slot 54, and at the same time the movable member 50 is rotated about its pivot 51.

The portions of the branch runners 17 and 18 mounted on the base 49 are tapered, coming substantially to a point at their inner ends, and the adjacent end of the movable member 50 is likewise tapered so that it may abut the tapered faces of the branch runners 17 and 18 and will form a continuation of the same when properly positioned. The opposite end of the movable member 50 is likewise tapered to some extent, and, if desired, may be pointed. A spring or other resilient member 55a is mounted so as to urge the member 52 at one end slightly off center, so that the pins 53 do not rest in the center of the bottom of the V-shaped slot 54 but are slightly to one side, as shown in Fig. 13a. The spring 55a holds the ends of the movable member toward the sides so that when the movable member 50 is urged vertically it will be moved by the V-shaped slot to a position to connect the main runner 16 with branch runner 17 and thus direct a current-collecting member straight through the switch.

Means are provided to cause the movable members 50 in a pair of switches to be moved upon contact with a pair of current-collecting members to switching position so as to guide the current-collecting members from main runners 16 to the branch runners 18. In other words, the pointed end of the switching member 50 will be moved to a position adjacent branch runner 18. A rail 56 is provided adjacent the main runner 16 and extends a distance along the switching member 50. Looped portions 57 extend upwardly from the rails 56 and fit about a rock shaft 58, to which they are fixedly secured. The rock shaft is mounted in bearing members 59. At the inner end of the rail 56 there is an upwardly extending arm 60 pivotally mounted intermediate the ends thereof about a pivot 61. Pivotaly mounted on the upper side of the switch about pivot 62 is a lever 63, one end of which may be provided with a pin 64, which latter pivotally engages the end of arm 60 whereby movement of the arm 60 will move the lever 63. The opposite end of lever 63 has a stop member 64a extending downwardly therefrom, which, under certain conditions, engages the adjacent upwardly extending portion 52 on movable member 19. The free end of one of the levers 63 is preferably connected to the opposite end of the lever 63 in the other switch of the pair by an insulating connecting member 65. Thus, movement of one of the levers 63 in one direction tends to move the other lever 63 in the pair of switches in the opposite direction.

The rails 56 are so positioned that the flanges of a pair of current-collecting members may simultaneously pass between the main runners 16 of a pair of switches and the rails 56. In this case the rails 56 urge the flanges of the current-collecting members against the main runners 16 and the inner ends of the movable members 50. Lateral pressure is thus exerted by the flanges of the current-collecting members through the mechanism just described which thereby tend to move the inner ends of the movable members 50 away from the rails against the pressure exerted by spring 55a. This force, coupled with the upward pressure of the current-collecting member, which normally amounts to about 28 pounds, moves the inner ends of the movable members 50 away from the rails 56 and upwardly so that the opposite or pointed ends of the movable members 50 are moved over against the branch runner 17 and the current-collecting members will pass straight through the switch. Therefore, as long as the longitudinal distance between the current-collecting members is not greater than the length of the rails 56, the current-collecting members of a pair will pass straight through. By altering the length of the rails 56, the longitudinal distance between the current-collecting members of a pair may be varied without permitting switching of the current-collecting members to the branch runners 18.

In case one of the current-collecting members of the pair is slightly in advance of the other but less than a distance corresponding to the length of the rails 56, it will cause its movable member 50 to be moved to straight-through position connecting main runner 16 and branch runner 17. After the advanced current-collecting member passes beyond its respective rail 56, means are provided to still maintain the other rail 56 in a position to exert a side pressure against the flange of the rearward current-collecting member and thereby the inner end of the movable member 50. In this case, the upwardly projecting portion 52 has been moved toward the side of branch runner 17, and will therefore lie closely adjacent stop member 64a, thereby substantially preventing movement of the lever 63 of that switch. This will maintain the rail 56 on the other switch in a position to exert pressure through the flange of the rearward current-collecting member against the movable member 50, thereby causing the rearward current-collector to move the movable member 50 in the other switch of the pair so that the outer end lies adjacent the branch runner 17 of that switch.

When the current-collecting members of a pair are longitudinally further apart than the length of the rails 56, the forward current-collecting member moves its rail 56 away from the main runner 16, which simultaneously causes the rail 56 in the other switch of the pair to be moved toward the main runner 16 of that switch. This can be done as the rearward current-collecting member will not come in contact with its rail 56 until the forward current-collecting member has passed beyond its rail 56. Due to the fact that the spring 55 holds the pins 53 slightly off center, as previously described, the upward pressure exerted by the current-collecting member will cause its switching member 50 to be moved so that the outer end is adjacent the branch runner 18 and the current-collecting member will thereby be switched. When the rearward current-collecting member engages its switch, the action is the same, and it also will be switched onto its branch runner 18.

The connecting member 65 may be made rigid or, if desired, may be provided with a resilient member which will give slightly under pressure. For this purpose one part of the connecting member 65 may be provided with a tubular portion 65a which fits over a piston portion 65b and a spring 65c may then be positioned between the two. The tubular portion is preferably provided with short slots through which screws are inserted and threaded into the piston portion 65b. This limits the amount of movement of the two portions of the connecting member 65.

It is therefore to be seen that the pair of switches disclosed in Figs. 13 through 15 are actuated so as to guide the current-collecting members along the desired wires automatically, merely through contact of the current-collecting members with the switches and the parts thereof. If the trolley bus carrying the current-collecting members has turned an amount less than that which would longitudinally separate the current-collecting members carried thereby a distance less than the length of the rails 56, the current-collecting members will pass through the switch. Furthermore, the permitted turning range of the bus may be varied by changing the length of the rails 56. However, if the bus has turned a sufficient distance to cause a longitudinal distance between the current-collecting members carried thereby to be greater than the length of the rails 56, the current-collecting members will be caused to switch.

Another feature of the switch disclosed in Figs. 13 through 15 is that current-collecting members passing along either of the branch runners 17 or 18 will automatically be directed along the movable member 50 to the main runner 16. In other words, the switch is a two-way switch. The reason for this is that the pointed end of the movable member 50 in its normal position, when not engaged by the current-collecting member, is in the position shown in Figs. 13a, 14 and 15, substantially midway between the inner sides of the branch runners 17 and 18, and extending slightly below the lower edges of the same. The distance between the outer side of the branch runners 17 and 18 to the opposite side of the pointed end of the movable member 50 is made slightly less than the distance between the inner faces of the flanges of the current-collecting members to be used therewith. Thus, a current-collecting member passing along side runners 17 or 18 will fit over the pointed end of the main runner 50, as well as the runner 17 or 18, along which it is passing, and tend to pull the two together, at the same time exerting an upward pressure which moves the movable member 50 to operable position.

The base member 49 with the parts mounted thereon does not comprise the entire switch. This would consist of a continuation of the main runner 16 and branch runners 17 and 18 with means by which they may be supported or connected to other structure. With this construction, the base 49, with the parts thereon, may be removed from the remainder of the switch without necessitating the removal of the entire switch from the system. In the same way, the switches shown in Figs. 7 through 12 may be formed with removable elements similar to the switch shown in Figs. 13 through 15.

While three embodiments of switches have been shown and described, it is to be understood that various modifications therein may be made. The shape of the slots 54 need not be just as shown and described. The pivot members 20 for the switching members 19 need not be right at the ends of the movable members nor need the pivots 51 of the movable members 50 be midway between the ends thereof. The desirable feature is to provide guide means for the movable runners so that they will be automatically moved and guided to proper position in accordance with the path of travel of the bus upon contact of the current-collecting members with the various portions of the switches. In this way, a double conductor over-head trolley system, having switches, cross-overs, etc., connected by the trolley wires, may be made absolutely automatic.

Referring to Figs. 16 through 20, there is shown a new form of simplified cross-over embodying this invention. The cross-over may comprise a base member 66 having runners 67, 68, 69 and 70 depending therefrom. Perforated ears 71 are provided in the base member 66 adjacent the outer ends of the runners and perforated ears 72 may be provided adjacent the central portion of the crossing. These ears provide means for connection to the cross spans to support the cross-over in proper position. In forming the base member 66, a central aperture or opening may be provided in which the operating structure hereinafter to be described is positioned. As shown particularly in Fig. 16, adjacent runners 67 and 68 and adjacent runners 69 and 70 may be formed in pairs with the oppositely disposed runners being substantially a continuation of each other.

The present cross-over is particularly suitable where the angle between the intersecting trolley wires is extremely small. The inner ends of the runners may be tapered as shown in Fig. 16. In this way, sufficient distance is provided between adjacent runners to permit the flanges of current-collecting members to pass therebetween. Means are provided for guiding a current-collecting member passing along runner 67 to the oppositely disposed runner 70 or along the runner 68 to runner 69, and vice versa. This means comprises a base plate 73 for attachment to the upper side of the base member 66 over the central aperture provided therein, so that it may be easily removed from the base member 66. On the underside of the base plate 73 adjacent the ends thereof are substantially pointed runner members 74, 75, 76 and 77, which, in effect, are continuations of, and when in position form, the inner ends of the runners 67, 68, 69 and 70. A movable guide member 78 is pivotally mounted substantially midway between the ends thereof to the base plate 73. A stud shaft 79 extends upwardly through a bearing portion 80 on the top of the base plate 73, and is movably mounted therein so as to be capable of vertical movement as well as rotation. The ends of the movable member 78 are preferably pointed so that the sides thereof may engage and lie close to the respective pointed runners 74, 75, 76 and 77. Extending upwardly from the movable member 78 through apertures in the base plate provided therefor are portions 81. The portions 81 are preferably positioned not far distant from the ends of the movable member 78. Projecting from the portions 81 are pins or similar members 82 which fit in slots 83 provided therefor in guide members 84. These slots 83, as shown particularly in Fig. 20, are substantially V-shaped. They not only serve to guide the pins 82 and thereby the movable member 78 to operative position, but also support the movable member 78. When in normal operative position the pins 82 seat in the bottom or apex of the slot 83 and the lower surface of the movable member 78 projects below the pointed runner portions 74, 75, 76 and 77. This is shown in Figs. 18 and 20. The distance between the outer sides of the runner portions 74, 75, 76 and 77, at the outer ends thereof, to the opposite side of the pointed ends of the movable member 78, is made slightly less than the distance between the inner faces of the flanges of the current-collecting members to be used therewith. With this construction, when a current-collecting member is moving along one of the runners such as the runner 67 on the base member, the inner face of the outer side thereof engages the outer side of the runner member 74 and the other inner face of the opposite side of the current-collecting member engages the far side of the pointed end of the movable member 78. As it moves along the movable member 78, due to the widening thereof, the current-collecting member forces the member 78 toward the runner member 74 and at the same time, due to the upward pressure on the current-collecting member, which pressure is ordinarily about 28 pounds, the movable member is moved upwardly and the pins 82 slide upwardly in the slots 83, so that the movable member 78 is urged into the position shown in Figs. 16 and 19. The movable member 78 is held in this position until the current-collecting member passes beyond the same and onto the oppositely disposed member 70, whereupon, due to the weight of the movable member, the same drops back into normal position with the ends of the movable member substantially midway between the runner portions 74 and 75 and the runner portions 76 and 77. With this construction, a current-collecting member passing along any one of the members 67, 68, 69 and 70 will be automatically and positively guided to the oppositely disposed runner. Guide flanges 84a are preferably provided on the base member 66. The movable parts are reduced to a minimum so that the whole cross-over may be inexpensive to manufacture and will continue in use for a long period of time without the necessity for any repairs.

Another feature of the present invention is the provision of a simple form of locking device which may be employed in securing various trolley fittings together, such as a dead-end approach to a switch or a section insulator to any other form of fitting. Ordinarily, in securing fittings together, the same are merely bolted. Great difficulty is frequently encountered in holding the fittings adjacent each other against the tensions thereon while the bolts are being inserted in place.

In the present invention, a locking means is employed which supplements the usual bolts and serves to hold the fittings in proper position for receiving the bolts even against tension on the fittings, and also removes considerable strain from the bolts themselves. In Fig. 21 a dead-end approach is shown as being connected to another fitting of the system. The approach, except for the locking means, which will now be described, is of the usual type so that no description thereof is believed to be necessary. At the inner end of the approach or section insulator or other form of over-head trolley fitting which it is desired to employ with another, there is provided a vertically extending bar portion 85 having a slot 86 therein. The side of the slot adjacent the fitting to which the approach or the like is to be attached is formed vertically, as shown at 87, and the opposite side has a gradual slant therein, as shown at 88. The fitting with which it is to be used is provided with a channeled portion 89 in which the bar 85 fits. Extending from the bottom of the channeled member 89 is a projecting member 90 having sides thereof of substantially the same shape and contour as the sides of the slot 86 and the bar 85. With this construction, in order to secure the approach to another fitting, the two fittings are pulled together until the notch 86 is slipped over the projecting portion 90. The necessary bolts 91 may then be inserted and made fast. With a locking device such as this fittings having tension thereon may be far more quickly and easily connected than in the usual forms of fittings where no such looking means is employed. Furthermore, the connection between the fittings is very strong because of the locking action between the slot and the projecting portion.

While I have shown and described a double conductor trolley system having switches, curves, cross-overs and other fittings, it is to be understood that various modifications therein may be made without departing from the spirit and scope of this invention, and therefore I wish to be limited only by the scope of the prior art and the appended claims.

I claim:

1. A double conductor trolley system for a vehicle provided with a pair of current collectors, comprising main conductors, branch conductors and a pair of switches at the intersection of said main and said branch conductors, said switches having movable guides for guiding a pair of current collectors in passing through said switches either along said main conductors or from said main to said branch conductors, and means including members positioned for engagement with said current collectors and responsive to engagement therewith for determining the setting of said switches, said members and associated means acting to set said switches to one position when said current collectors are more than a predetermined distance apart longitudinally when passing said members, and means for setting said switches to the other position.

2. A double conductor trolley system for a vehicle provided with a pair of current collectors, comprising main conductors, branch conductors and a pair of switches at the intersection of said main and said branch conductors, said switches having movable guides for guiding a pair of current collectors in passing through said switches either along said main conductors or from said main to said branch conductors, and means including members positioned for engagement with said current collectors and responsive to engagement therewith for determining the setting of said switches, said members and associated means acting to set said switches to one position when said current collectors are less than a predetermined distance apart longitudinally when passing said members, and means for setting said switches to the other position.

3. A double conductor trolley system for a vehicle provided with a pair of current collectors comprising main conductors, branch conductors and a pair of switches at the intersection of said main and said branch conductors, said switches having movable guides for guiding a pair of current collectors in passing through said switches, either along said main conductors or from said main to said branch conductors, and means including members positioned for either simultaneous or serial engagement with said pair of current collectors for determining the setting of said switches, said engagement being determined by the angularity of the vehicle to the main current conductors when said current collectors are passing said members.

4. A double conductor trolley system for a vehicle provided with a pair of current collectors comprising main conductors, branch conductors and a pair of adjustable switches at the intersection of said main and said branch conductors, means for setting said switches to guide said pair of current collectors in passing through said switches either along said main conductors or from said main to said branch conductors, said means including members positioned for either simultaneous or serial engagement with said pair of current collectors for determining the setting of said switches, said engagement being determined by the angularity of the vehicle to the main current conductors when said current collectors are passing said members.

5. A double conductor trolley system for a vehicle provided with a pair of current collectors comprising main conductors, branch conductors and a pair of switches at the intersection of said main and said branch conductors, each of said switches having a movable guide, operating mechanism for setting said switches to guide pairs of current collectors in passing through said switches either along said main conductors or from said main to said branch conductors, and members for actuating said operating mechanism positioned for engagement by a pair of current collectors before the same pass over their respective movable guides, said members acting to selectively set said switches by engagement with said current collectors, said engagement of said current collectors with said members to control the setting of said switches being modified by the relative longitudinal position of said current collectors when passing said members, said longitudinal position of said current collectors varying with the angularity of the vehicle with respect to said main conductors.

6. A double conductor trolley system for a vehicle provided with a pair of current collectors comprising main conductors, branch conductors, and a pair of switches at the intersection of said main and said branch conductors, each of said switches having a movable guide, means including members positioned for engagement by the respective current collectors of a pair before the same pass over their respective movable guides, and means controlled by such engagement for setting said switches to guide a pair of current collectors in passing through said switches either along said main conductors or from said main to said branch conductors, said engagement of said current collectors with said members to control the setting of said switches being modified by the relative longitudinal position of said current collectors when passing said members, said longitudinal position of said current collectors varying with the angularity of the vehicle with respect to said main conductors.

7. A double conductor trolley system for a vehicle provided with a pair of current collectors comprising main conductors, branch conductors, and a pair of switches at the intersection of said main and said branch conductors, each of said switches having a movable guide, operating mechanism for setting said switches to guide pairs of current collectors in passing through said switches either along said main conductors or from said main to said branch conductors, and contact devices associated with each of said main conductors positioned for engagement by a pair of current collectors before the same pass over their respective movable guides, said switches and contact devices being so constructed and positioned with respect to each other and to the conductors that said switches will be set to guide said current collectors along said main conductors only when the current collectors of said vehicle are in a predetermined position longitudinally of the main conductors relative to one another and to the contact devices as the collectors pass the contact devices, said longitudinal position of the current collectors varying with the angularity of the vehicle with respect to said main conductors, and means to set said switches to guide the current collectors from said main to said branch conductors.

8. A double conductor trolley system for a vehicle provided with a pair of current collectors comprising main conductors, branch conductors, and a pair of switches at the intersection of said main and said branch conductors, each of said switches having a movable guide, operating mechanism for setting said switches to guide pairs of current collectors in passing through said switches either along said main conductors or from said main to said branch conductors, and contact devices associated with each of said main conductors positioned for engagement by a pair of current-collectors before the same pass over their respective movable guides, said switches and contact devices being so constructed and positioned with respect to each other and to the conductors that the switches will be set to guide said current collectors from said main to said branch conductors only when the current collectors of said vehicle are in a predetermined position longitudinally of the main conductors relative to one another and to said members as the current collectors pass said members, said longitudinal position of the current collectors varying with the angularity of the vehicle with respect to said main conductors, and means to set said switches to guide said current collectors along said main conductors.

9. A double conductor trolley system for a vehicle provided with a pair of current collectors comprising main conductors, branch conductors, and a pair of switches at the intersection of said main and said branch conductors, each of said switches having a movable guide, mechanically operated mechanism for setting said switches to guide pairs of current collectors in passing through said switches either along said main conductors or from said main to said branch conductors, and members for actuating said mechanically operated mechanism positioned for engagement by a pair of current collectors before the same pass over their respective movable guides, said members acting to selectively set said switches by engagement with said current collectors, said engagement of said current collectors with said members to control the setting of said switches being modified by the relative longitudinal position of said current collectors when passing said members, said longitudinal position of said current collectors varying with the angularity of the vehicle with respect to said main conductors.

10. In a double conductor trolley system for a vehicle provided with a pair of current collectors comprising main conductors and branch conductors, a pair of cooperating switches positioned at the intersections of said main and said branch conductors, each of said switches comprising a main runner, branch runners, and a movable switching member for being moved by contact of a current collector therewith to position for directing current collectors between said main and either of said branch runners, means for guiding said movable switching members to either position upon contact of a pair of current collectors with said switching members, and contact devices positioned for engagement by said pair of current collectors to actuate said means, the engagement of said current collectors with said contact devices to selectively actuate said means being modified by the relative longitudinal position of said current collectors when passing said members, said longitudinal position of said current collectors varying with the angularity of the vehicle with respect to said main conductors.

11. A pair of switches for use in a double-conductor trolley system for guiding pairs of swivelled current-collectors carried by a vehicle, each of said switches comprising a main runner, branch runners, and a movable switching member for directing collectors between said main and either of said branch runners, mechanically operated mechanism for guiding said switching member to a position adjacent either of said branch runners, and means including contact devices positioned for engagement by said pair of current collectors for preventing movement of said switching member to one of said positions, the engagement of said current-collectors with said contact devices to prevent movement of said switching members to one of said positions being selectively determined by the relative longitudinal position of said current-collectors when passing said contact devices, said longitudinal position of said current collectors varying with the angularity of the vehicle with respect to said main conductors.

12. A trolley guide having runners thereon at an angle to each other and a unitary movable member normally in a neutral position pivotally mounted for vertical and lateral movement for being moved to position adjacent to and in substantial alignment with either of said runners by contact of a current collector therewith for guiding a current collector from or to said runners, said guide being provided with a slot extending upwardly and to each side of the lower portion thereof, means on said movable member for cooperating with said slot to guide said movable member to position adjacent either of said runners upon contact of a current collector therewith, said movable member being so shaped and positioned that a current-collector passing along either runner will be guided onto said movable member when the latter is in said neutral position.

13. A trolley guide having spaced runners thereon at an angle to each other and a unitary movable member normally in a neutral position pivotally mounted intermediate the ends thereof for vertical and lateral movement for being moved to position adjacent to and in substantial alignment with either of said runners by contact of a current collector therewith for guiding a current collector from or to said runners, said guide being provided with a slot extending upwardly and to each side of the lower portion thereof, means on said movable member for cooperating with said slot to guide said movable member to position adjacent either of said runners upon contact of a current collector therewith, said movable member being so shaped and positioned that a current-collector passing along either runner will be guided onto said movable member when the latter is in said neutral position.

14. A trolley switch comprising a main runner, a plurality of branch runners, and a unitary movable switching member normally in a neutral position for being moved into operative position with one end adjacent said main runner and the other end adjacent either of said branch runners, said switching member having a projecting portion on the end adjacent said branch runners and said switch having a vertically and horizontally extending slot therein in which said projecting portion fits of a shape to guide said movable member to operative position upon movement thereof, said projecting portion when in one position in said slot causing said switching member to substantially align with one of said branch runners and when in another position to align with another branch runner, said movable member being moved to operable position by contact of a current collector therewith and means cooperating with said movable member for preventing movement of said projecting member in a portion of said slot.

15. A trolley switch comprising a main runner, a plurality of branch runners, and a unitary movable switching member normally in a neutral position for being moved into operative position with one end adjacent said main runner and the other end adjacent either of said branch runners, said switching member having a projecting portion on the end adjacent said branch runners and said switch having a vertically and horizontally extending slot therein in which said projecting portion fits of a shape to guide said movable member to operative position upon movement thereof, said projecting portion when in one position in said slot causing said switching member to substantially align with one of said branch runners and when in another position to align with another branch runner, said movable member being moved to operable position by contact of a current collector therewith and means cooperating with said movable member and actuated by contact of a current collector therewith for preventing movement of said projecting member in a portion of said slot.

16. A pair of cooperating trolley switches for use in a double-conductor trolley system for guiding pairs of current collectors carried by a vehicle, each of said switches comprising a main runner, a unitary movable switching member normally in a neutral position and a pair of branch runners, said switching members being pivoted at their ends adjacent said main runners and having the other ends movable into position adjacent either of said branch runners, said switches having slots therein for cooperating with said switching members of a shape to guide said switching members to position adjacent either of said branch runners upon movement thereof, said switching members being moved to operable position by contact of current collectors therewith, and means positioned for being actuated by contact of a pair of current collectors therewith for limiting movement of said switching members to operable position adjacent one set of said branch runners, the engagement of said current-collectors with said contact devices to prevent movement of said switching members to one of said positions being selectively determined by the relative longitudinal position of said current-collectors when passing said contact devices, said longitudinal position of said current collectors varying with the angularity of the vehicle with respect to said main conductors.

17. A pair of cooperating trolley switches for use in a double conductor trolley system for guiding pairs of swivelled current collectors carried by a vehicle, each of said switches comprising a main runner, a vertically and horizontally movable switching member, and a pair of branch runners, said switching members being pivotally mounted at their ends adjacent said main runners and having the other ends movable into position adjacent either of said branch runners by contact of current collectors with said movable members, said switches having vertically and horizontally extending slots for cooperating with said switching members to guide the same to position adjacent either of said branch runners upon movement thereof, operatively connected means associated with each switch for limiting movement of said movable members to one operative position, said means being actuated by substantially simultaneous contact by a pair of current collectors with said movable members.

18. A pair of cooperating trolley switches for use in a double conductor trolley system for guiding pairs of swivelled current collectors carried by a vehicle, each of said switches comprising a main runner, a vertically and horizontally movable switching member, and a pair of branch runners, said switching members being pivotally mounted at their ends adjacent said ing pivotally mounted at their ends adjacent said main runners and having the other ends movable into position adjacent either of said branch runners by contact of a current collector with said movable member, said switches having vertically and horizontally extending slots for cooperating with said switching members to guide the same to position adjacent either of said branch runners upon movement thereof, operatively connected means associated with each switch for limiting movement of said movable members to one operative position, and means actuated by substantially simultaneous contact of a pair of current collectors therewith for actuating said first means.

19. A pair of cooperating trolley switches for guiding pairs of swivelled collectors carried by a vehicle, each of said switches comprising a main runner, a pair of branch runners, and a vertically and horizontally movable switching member for being moved to position to connect said main to either of said branch runners, said switches having vertically and horizontally extending slots therein, said movable members having means for cooperating with said slots to guide said movable members to either position, means normally tending to cause said switching members to be moved to one position upon contact of said switching members with said pair of collectors, and means including contact devices associated with said switches for being actuated by substantially simultaneous contact of a pair of collectors therewith for causing said switching members to be moved to said other position upon contact with said current collectors.

20. A pair of cooperating trolley switches for use in a double-conductor trolley system for guiding pairs of swivelled current collectors carried by a vehicle, each of said switches comprising a main runner, a pair of branch runners, and a movable switching member, said switching members being pivotally mounted intermediate the ends thereof for horizontal and vertical movement by contact of current collectors therewith to positions connecting said main with either of said branch runners, said switches having a V-shaped slot adjacent each end of said switching members for cooperating with said switching members to guide the same to either operative position, resilient means for urging said switching members slightly toward one position whereby contact thereof with a pair of current-collecting members would cause said switching members to move to said position and means including contact devices associated with said switches for being actuated by substantially simultaneous contact of a pair of current collectors therewith for causing said switching members to be moved to their other position upon contact with said current collectors, said movable members being so shaped and positioned that a current-collector passing along either runner will be guided onto said movable member.

RICHARD ROY HOLDEN.